(12) United States Patent
Sharma et al.

(10) Patent No.: US 12,367,228 B2
(45) Date of Patent: Jul. 22, 2025

(54) METHODS AND SYSTEMS FOR PERFORMING LEGAL BRIEF ANALYSIS

(71) Applicant: RELX Inc., Miamisburg, OH (US)

(72) Inventors: Sanjay Sharma, Raleigh, NC (US); Janardhana R. Punuru, Cary, NC (US); Mahesh Pendyala, Folsom, CA (US); Mark Shewhart, Raleigh, NC (US)

(73) Assignee: LexisNexis, New York, NY (US)

( * ) Notice: Subject to any disclaimer, the term of this patent is extended or adjusted under 35 U.S.C. 154(b) by 502 days.

(21) Appl. No.: 17/363,840

(22) Filed: Jun. 30, 2021

(65) Prior Publication Data
US 2021/0406290 A1 Dec. 30, 2021

Related U.S. Application Data

(60) Provisional application No. 63/046,148, filed on Jun. 30, 2020.

(51) Int. Cl.
*G06F 16/338* (2019.01)
*G06F 16/31* (2019.01)
(Continued)

(52) U.S. Cl.
CPC .......... *G06F 16/338* (2019.01); *G06F 16/313* (2019.01); *G06F 16/3347* (2019.01);
(Continued)

(58) Field of Classification Search
CPC .. G06F 16/338; G06F 16/313; G06F 16/3347; G06F 16/382; G06F 40/20; G06F 40/30; G06N 20/00
See application file for complete search history.

(56) References Cited

U.S. PATENT DOCUMENTS 7,840,891 B1* 11/2010 Yu ..................... G06F 40/174
715/223
7,844,899 B2 11/2010 Boucher
(Continued)

FOREIGN PATENT DOCUMENTS

KR 1020190015797 A 2/2019

OTHER PUBLICATIONS

PCT/US21/39845 Notification of Transmittal of the International Search Report and the Written Opinion of the International Searching Authority, or the Declaration, mailed Oct. 14, 2021.

*Primary Examiner* — Pierre M Vital
*Assistant Examiner* — Zuheir A Mheir
(74) *Attorney, Agent, or Firm* — DINSMORE & SHOHL LLP

(57) ABSTRACT

A method includes receiving, at a computing device, an electronic document, wherein the electronic document is a legal brief comprising a plurality of paragraphs; identifying one or more argument paragraphs from among the plurality of paragraphs, wherein each of the one or more argument paragraphs includes one or more legal arguments; performing a textual search of a corpus of legal documents based on a selected set of the identified argument paragraphs; performing a semantic search of the corpus of legal documents based on the selected set of the identified argument paragraphs; combining results of the textual search and the semantic search; and presenting the combined results to a user.

17 Claims, 4 Drawing Sheets

(51) Int. Cl.
*G06F 16/334* (2025.01)
*G06F 16/38* (2019.01)
*G06F 40/20* (2020.01)
*G06N 20/00* (2019.01)

(52) U.S. Cl.
CPC ............ *G06F 16/382* (2019.01); *G06F 40/20* (2020.01); *G06N 20/00* (2019.01)

(56) References Cited

U.S. PATENT DOCUMENTS

| | | | |
|---|---|---|---|
| 9,760,961 | B2 | 9/2017 | Steensgard |
| 10,373,278 | B2 | 8/2019 | Badenes et al. |
| 10,929,615 | B2 | 2/2021 | Badenes et al. |
| 11,625,421 | B1 * | 4/2023 | Finkenberg ............ G06F 40/30 707/769 |
| 2007/0185865 | A1 * | 8/2007 | Budzik ................. G06F 16/951 707/999.005 |
| 2008/0319735 | A1 * | 12/2008 | Kambhatla ............. G06F 40/30 704/9 |
| 2009/0150827 | A1 * | 6/2009 | Meyer ................. G06F 16/9535 715/810 |
| 2012/0151310 | A1 * | 6/2012 | El-kalliny ........... G06F 16/9535 707/769 |
| 2014/0180935 | A1 | 6/2014 | Rhoads et al. |
| 2015/0310571 | A1 * | 10/2015 | Brav ...................... G06Q 10/00 705/311 |
| 2016/0342603 | A1 | 11/2016 | Ritchey et al. |
| 2016/0342681 | A1 * | 11/2016 | Kesin ...................... G06F 16/93 |
| 2019/0005029 | A1 * | 1/2019 | Mills ...................... G06F 40/30 |
| 2019/0026553 | A1 * | 1/2019 | Deshpande ............ G06N 20/00 |
| 2020/0151392 | A1 * | 5/2020 | Crabtree ................ G06N 5/022 |
| 2021/0109958 | A1 * | 4/2021 | Behtash ................ G06F 18/214 |
| 2021/0406264 | A1 * | 12/2021 | Nahamoo ............. G06N 5/022 |
| 2022/0222442 | A1 * | 7/2022 | Akimoto ............. G06F 16/3344 |
| 2022/0284312 | A1 * | 9/2022 | Brecque ............ G06F 40/247 |
| 2024/0086452 | A1 * | 3/2024 | Agley ..................... G06F 16/41 |

* cited by examiner

METHODS AND SYSTEMS FOR PERFORMING LEGAL BRIEF ANALYSIS

CROSS-REFERENCE TO RELATED APPLICATION

This application claims priority to U.S. Provisional Application No. 63/046,148, filed Jun. 30, 2020, the entire contents of which is hereby incorporated by reference.

FIELD

The present disclosure generally relates to document searching, and more particularly to a method and system for performing legal brief analysis.

BACKGROUND

While drafting legal briefs, attorneys or other professionals may present arguments related to a number of legal topics. These arguments are typically bolstered by citations to case law and other legal authorities. Accordingly, it may be desirable to perform a search of case law for topics related to the arguments presented in the brief.

A number of tools currently exist for searching case law. However, these tools generally require a user to enter legal topics to be searched. Accordingly, a drafter of a legal brief may be required to sequentially perform a search of each topic associated with the legal brief in one of these tools. It may be preferable to automatically perform a search related to all of the legal topics discussed in a legal brief and to integrate the search functionality into a word processor or other program being used to write the brief.

SUMMARY

In one aspect, a method may include receiving a legal brief as an electronic document, identifying one or more argument paragraphs containing legal arguments from the legal brief, performing a textual search of a corpus of legal documents based on a selected set of the identified argument paragraphs, performing a semantic search of the corpus of legal documents based on the selected set of the identified argument paragraphs, combining results of the textual search and the semantic search, and presenting the combined results to a user.

In another aspect, a system may include a processing device and a non-transitory, processor-readable storage medium including one or more programming instructions stored thereon. When executed, the programming instructions may cause the processing device to receive a legal brief as an electronic document, identify one or more argument paragraphs containing legal arguments from the legal brief, perform a textual search of a corpus of legal documents based on a selected set of the identified argument paragraphs, perform a semantic search of the corpus of legal documents based on the selected set of the identified argument paragraphs, combine results of the textual search and the semantic search, and present the combined results to a user.

In another aspect, a non-transitory, computer-readable storage medium may be operable by a computer and may include one or more programming instructions stored thereon. The programming instructions may cause a processing device to receive a legal brief as an electronic document, identify one or more argument paragraphs containing legal arguments from the legal brief, perform a textual search of a corpus of legal documents based on a selected set of the identified argument paragraphs, perform a semantic search of the corpus of legal documents based on the selected set of the identified argument paragraphs, combine results of the textual search and the semantic search, and present the combined results to a user.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
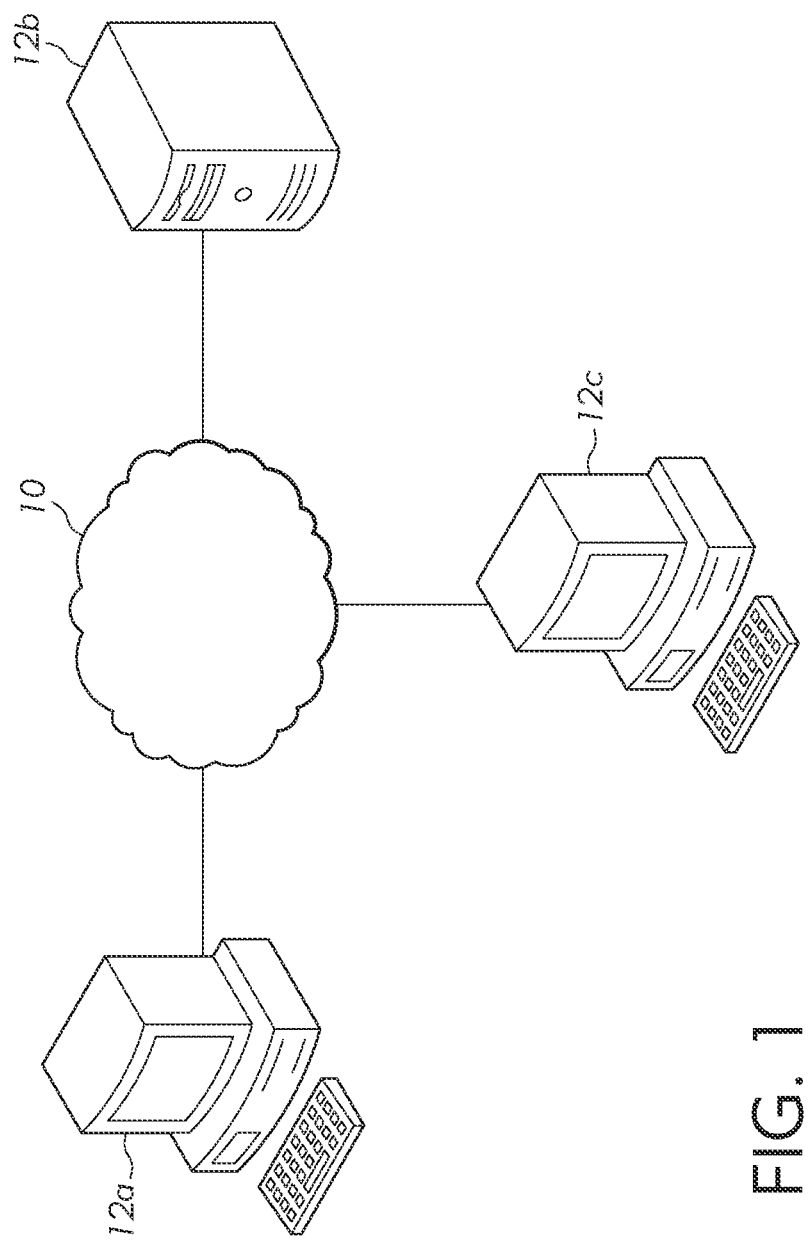
FIG. 1 schematically depicts an illustrative computing network for a system for performing legal brief analysis according to one or more embodiments shown and described herein.

Referring generally to the figures, embodiments described herein are directed to methods and systems for performing legal brief analysis. In particular, embodiments described herein identify argument paragraphs in a legal brief, search for case law based on the legal concepts in the identified argument paragraphs, and present the search results to a user.

Attorneys often draft legal briefs that contain legal arguments to support a certain position. These legal arguments are often supported by citations to legal authority or precedents, including case law or statutes. As such, attorneys may desire to thoroughly research the outstanding legal precedents associated with the arguments presented in a legal brief in order to ensure they are presenting the best possible arguments and prepare a persuasive legal brief.

Attorneys may use existing tools to research legal issues discussed in a legal brief. However, legal briefs may discuss a large number of legal issues. As such, an attorney may need to repeatedly utilize a search tool to research all of the legal issues discussed in a brief. Furthermore, there may be legal issues that would be useful for an attorney to research for a legal brief, of which the attorney may not be aware. As such, disclosed herein is a method and system for automatically analyzing a legal brief and performing a search of legal authority for legal issues related to the brief.

In embodiments disclosed herein, a system analyzes a legal brief and determines which paragraphs of the brief include argument paragraphs. That is, the system determines which paragraphs include legal arguments. After identifying which paragraphs of a legal brief contain legal arguments, the system performs a search of legal documents in a corpus (e.g., case law and statutes) based on each of the identified argument paragraphs.

The system may perform two types of searches. The first search is a textual search that compares the text of the argument paragraphs to the text of the legal documents in the corpus. The second search is a semantic search that compares semantic meaning of the argument paragraphs to semantic meaning of the legal documents in the corpus. Search results are returned for each of the two searches and the search results are combined. The combined search results may be presented in a user-friendly way such that a user may easily ascertain how the identified legal authorities relate to the brief. The user may also provide user feedback to cause the system to perform subsequent searches as specified by the user.

The system may operate as a plug-in or add-in to a word processor or other software program. For example, a user may use a word processor software to draft a legal brief and may then utilize a plug-in to the word processor that performs the functions described herein. The search results associated with the legal brief may then be presented within the word processor software so that the user can see the search results associated with particular paragraphs of the legal brief. In other examples, a user may upload a legal brief to a website or cloud server and the results may then be transmitted back to the user.

Referring now to the drawings, FIG. 1 depicts an illustrative computing network, illustrating components of a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to facilitate legal brief analysis, according to the embodiments described herein. The user computing device 12a may display and receive input from a graphical user interface, and display search results, as disclosed herein. The user computing device 12a may also facilitate receiving user input after the search results are presented to a user. This user feedback may be used to perform additional searches, as disclosed herein. The user computing device 12a may also be utilized to perform other user functions.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into a document database.

The server computing device 12b may receive a legal brief in the form of an electronic document from the user computing device 12a and may perform analysis of the received legal brief and a search for relevant legal issues using the techniques disclosed herein. After performing the search and identifying a result set of documents, the server computing device 12b may transmit the result set of documents and related information to the user computing device 12a such that the user computing device 12a may display the result set of documents and information pertaining to the result set of documents. The components and functionality of the server computing device 12b will be set forth in detail below.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, the server computing device 12b, and the administrator computing device 12c may represent a plurality of computers, servers, databases, etc.

Figure 2:
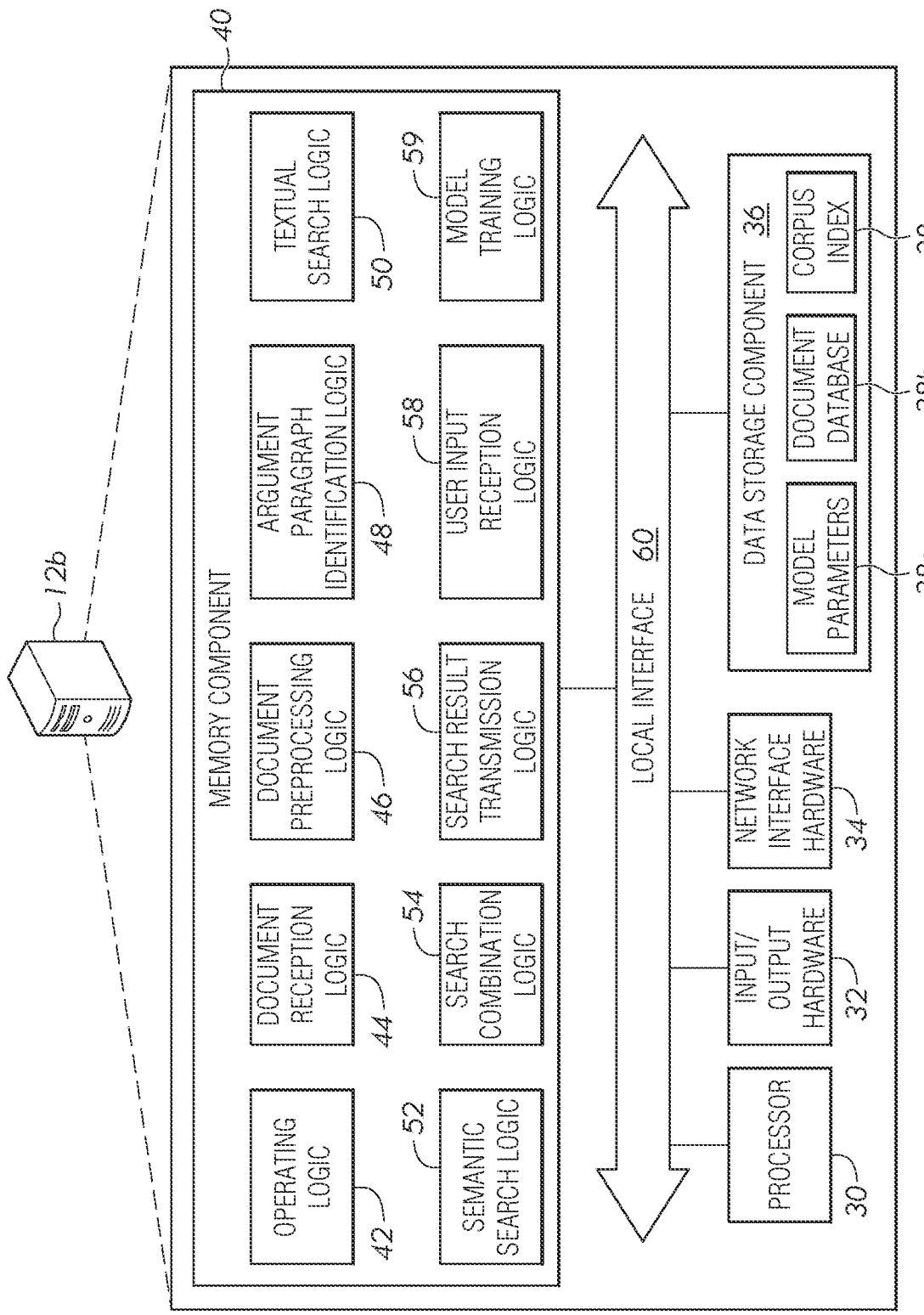
FIG. 2 schematically depicts the server computing device from FIG. 1, further illustrating hardware and software that may be used in performing legal brief analysis according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store, for example, model parameters 38a, a document database 38b, and a corpus index 38c), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store, for example, operating logic 42, document reception logic 44, document pre-processing logic 46, argument paragraph identification logic 48, textual search logic 50, semantic search logic 52, search combination logic 54, search result transmission logic 56, user input reception logic 58, and model training logic 59 (each of which may be embodied as a computer program, firmware, or hardware, as an example). A local interface 60 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store, for example, the model parameters 38a, the document database 38b, and/or the corpus index 38c. The data storage component 36 may also store other data in some embodiments.

In at least one embodiment, the model parameters 38a may be parameters for a model to identify argument paragraphs in a legal brief, as disclosed herein. The model parameters 38a may be learned by training the model using machine learning techniques, as disclosed in further detail below.

The document database 38b includes a corpus of documents that have been organized and indexed for searching. In one example, the document database 38b may include case law and statutes. However, in other examples, the document database 38b may include additional documents as well, such as law review articlesor documents from websites.

The corpus index 38c may include a list of known concepts and an identification of one or more documents in the document database 38b that are associated with each known concept. In some examples, the corpus index 38c may contain headnotes and reasons for citing. Headnotes may indicate important concepts and/or passages from a legal authority. Reasons for citing may include one or more reasons why a legal authority was cited in another legal authority (e.g., why one case was cited by a judge in another case). The headnotes and reasons for citing of the corpus index 38c may be curated by experts who have reviewed the corpus of documents in the document database 38b to create the headnotes and reasons for citing.

The model parameters 38a, the document database 38b, and the corpus index 38c may be stored in one or more data storage devices. In another embodiment, the server computing device 12b may be coupled to a remote server or data storage device that includes one or more of the documents in the document database 38b. Other data may be stored in the data storage component 36 to provide support for functionalities described herein.

Included in the memory component 40 are, for example, the operating logic 42, the document reception logic 44, the document pre-processing logic 46, the argument paragraph identification logic 48, the textual search logic 50, the semantic search logic 52, the search combination logic 54, the search result transmission logic 56, the user input reception logic 58, and/or the model training logic 59. Other logic modules not specifically recited herein may also be included within the memory component 40 without departing from the scope of the present disclosure. The operating logic 42 may include an operating system and/or other software for managing components of the server computing device 12b.

The document reception logic 44 may receive a legal brief in the form of an electronic document. The electronic document may be in a variety of data formats such as Microsoft Word, PDF, and the like. In embodiments, the document reception logic 44 may receive an electronic document from the user computing device 12a. In embodiments, a user may utilize the user computing device 12a to upload or otherwise transfer an electronic document to the server computing device 12b, which may be received by the document reception logic 44. In the illustrated example, the electronic document received by the document reception logic 44 includes a legal brief. However, it should be understood that, in other examples, the electronic document received by the document reception logic 44 may include other types of documents. In some examples, the document reception logic 44 may also receive user input associated with the search to be performed by the server computing device 12b. For example, a user may specify a particular jurisdiction. When a jurisdiction is specified by a user, all searches performed, as disclosed herein, may be limited to legal documents relevant to the specified jurisdiction.

The document pre-processing logic 46 may perform pre-processing of the electronic document received by the document reception logic 44, as disclosed herein. A legal brief typically includes a number of different sections and a number of paragraphs within each section. Many of these paragraphs do not contain any legal arguments. For example, there may be paragraphs describing the parties of a lawsuit, the factual background of the lawsuit, a table of authorities, a prayer for relief, and the like. Sections and paragraphs of a legal brief such as these generally do not contain any discussion of legal issues or legal arguments. Accordingly, it may be desirable for the method and system disclosed herein to ignore these paragraphs when performing a search of a corpus of legal documents. Other paragraphs in a legal brief may include discussions of legal issues and legal arguments. These are the paragraphs for which the method and system disclosed herein perform a search of the corpus of legal documents. The argument paragraph identification logic 48 may determine which paragraphs of a legal brief are argument paragraphs containing legal arguments, using the techniques described in further detail below. However, before the argument paragraph identification logic 48 performs this functionality on a legal brief, the document pre-processing logic 46 may pre-process the legal brief using the techniques described herein.

As discussed above, a legal brief may contain a large number of paragraphs. Each paragraph of a legal brief may be analyzed by the argument paragraph identification logic 48 to determine whether the paragraph is an argument paragraph containing legal arguments, as discussed in further detail below. However, the paragraphs in the brief may not be organized in an ideal way for performing a search of each paragraph. For example, some long paragraphs may be better suited to be broken up into two or more smaller paragraphs and a search performed for each of the smaller paragraphs. Alternatively, some smaller paragraphs may be better suited to be combined into a single paragraph for which a search is performed. Accordingly, the document pre-processing logic 46 may perform pre-processing on a legal brief to convert the plurality of paragraphs of the brief into a plurality of logical passages, as described in further detail below.

A logical passage may include a group of sentences from one or more consecutive paragraphs of a document that include one or more related ideas for which a search of a corpus of legal documents may be made. In some examples, a logical passage may include a single paragraph of a document. In some examples, a logical passage may include multiple paragraphs of a document. In other examples, a single paragraph of a document may include multiple logical passages.

In embodiments, the document pre-processing logic 46 may convert the paragraphs of a document into logical passages using pre-defined business rules. These business rules may include a set of rules for determining which paragraphs or portions of paragraphs of a document to include in a logical passage. In one example, a business rule may indicate that a paragraph that ends in a colon should include the following paragraph in a logical passage. In another example, a business rule may indicate that bulleted lists and block quotes should each be part of a single logical passage. In another example, a business rule may set a minimum and/or maximum length of logical passages. While certain exemplary business rules are discussed above, it should be understood that the document pre-processing logic 46 may utilize other business rules in addition to or instead of the business rules discussed herein.

The document pre-processing logic 46 may utilize predefined business rules to convert the paragraphs of a document into logical passages. In other examples, the document pre-processing logic 46 may utilize other techniques to convert paragraphs into logical passages. Once the document pre-processing logic 46 determines a plurality of logical passages associated with a document, the argument paragraph identification logic 48 may determine which of the logical passages include argument paragraphs containing legal arguments, as discussed in further detail below.

As discussed above, only certain paragraphs of a legal brief typically contain legal arguments. Accordingly, it may not be useful to perform a search for legal issues contained in paragraphs that do not include legal arguments. Thus, the argument paragraph identification logic 48 may identify which paragraphs of a legal brief are argument paragraphs containing legal arguments and which paragraphs do not contain legal arguments. In the illustrated example, the argument paragraph identification logic 48 analyzes each logical passage identified by the document pre-processing logic 46 and determines whether each such logical passage is an argument paragraph based on predetermined business rules, as described above. However, in other examples, the argument paragraph identification logic 48 may analyze each paragraph of a legal brief or any other grouping of sentences and paragraphs in a legal brief.

In embodiments, the argument paragraph identification logic 48 may determine a feature embedding of each logical passage and input the feature embedding into a trained machine learning model. The argument paragraph identification logic 48 may also input metadata associated with a logical passage into the trained model, as discussed below. The trained model may then predict whether a logical passage includes an argument paragraph and the argument paragraph identification logic 48 may identify argument paragraphs based on the predictions of the trained model.

In some examples, the model may be trained using the model training logic 59, discussed herein. However, in other examples, the model may be trained separately from the server computing device 12*b* and the server computing device 12*b* may store a pre-trained model.

The model training logic 59 may train a machine learning model to receive inputs including a feature embedding of a paragraph or logical passage and output a prediction as to whether the paragraph or logical passage includes an argument paragraph that contains legal arguments. In the illustrated example, the model training logic 59 uses a random forest algorithm. However, in other examples, the model training logic 59 may utilize other types of machine learning models.

As discussed above, the model may receive a feature embedding of a paragraph and metadata associated with the paragraph. In the illustrated example, the argument paragraph identification logic 48 determines a feature embedding of a paragraph or logical passage by counting the number of occurrences of each word in the paragraph or logical passage. The argument paragraph identification logic 48 then determines a term frequency (TF) score for each word based on the number of occurrences of the word in the paragraph or logical passage. The argument paragraph identification logic 48 then determines an inverse document frequency (IDF) score for each word based on the relative frequency that each word occurs in the corpus of documents stored in the document database 38*b*. The argument paragraph identification logic 48 then determines a term frequency-inverse document frequency (TF-IDF) score for each word in the paragraph or logical passage by combining the TF score and the IDF score.

After determining a TF-IDF score for each word in a paragraph or logical passage, the argument paragraph identification logic 48 may identify the words having the highest TF-IDF scores. In some examples, the argument paragraph identification logic 48 may identify a fixed number of words having the highest TF-IDF scores (e.g., the words with the 10 highest TF-IDF scores). The argument paragraph identification logic 48 may then input the TF-IDF scores for the selected words into the model as features.

In addition to the TF-IDF scores of the words in a paragraph or logical passage, the argument paragraph identification logic 48 may also identify metadata associated with a paragraph or logical passage. Examples of such metadata may include the length of the paragraph or logical passage, the position of the paragraph or logical passage in the document, the section heading of the section in which the paragraph or logical passage is located, the position of the paragraph or logical passage within that section, the types of font in a paragraph or logical passage (e.g., bold, underline, or italics), the number of citations in a paragraph or logical passage, whether party names are included, whether there are references to money or currency, whether there are references to a court, are there references to statutes are rules, and the like. While certain examples of metadata are discussed above, in other examples, the argument paragraph identification logic 48 may identify other types of metadata associated with a paragraph or logical passage. In some examples, the argument paragraph identification logic 48 may utilize a list of regular expressions to generate features associated with metadata of a paragraph or logical passage.

After the argument paragraph identification logic 48 determines a TF-IDF score for some number of words of a paragraph or logical passage and determines metadata associated with the paragraph or logical passage, the TF-IDF scores and the metadata may be input to the model as features. The model may then output a prediction as to whether the paragraph or logical passage is an argument paragraph based on the input features.

During training, the model training logic 59 may train the model using training data. The training data may include a large number of paragraphs taken from legal briefs. Each paragraph of the training data may be labeled to indicate whether not it is an argument paragraph. In some examples, the paragraphs of the training data may have one of three labels, a first label indicating that a paragraph is definitely an argument paragraph, a second label indicating that a paragraph is definitely not an argument paragraph, and a third label indicating that a paragraph may be an argument paragraph. During training of the model, the model training logic 59 may adjust the training loss associated with each paragraph of the training data based on the label given to each paragraph.

To train the model, the argument paragraph identification logic 48 may determine feature embeddings for each paragraph of the training data, using the techniques described above, and the features embeddings may be input to the model training logic 59. The model training logic 59 may then train the model using supervised learning techniques. That is, the model training logic 59 may train the parameters of the model to minimize a cost function across all of the training data paragraphs based on the labels of the training data paragraphs. After the model training logic 59 trains the model based on the training data, the learned parameters may be stored in the data storage component 36 as the model parameters 38a.

Once the model is trained, the argument paragraph identification logic 48 may utilize the model parameters 38a to predict whether a paragraph or logical passage is an argument paragraph based on the feature embedding of the paragraph or logical passage determined by the argument paragraph identification logic 48 discussed above. If the trained model predicts that a paragraph or logical passage is most likely an argument passage, then the argument paragraph identification logic 48 may determine that the paragraph or logical passage is an argument paragraph.

After the argument paragraph identification logic 48 identifies one or more argument paragraphs, a search may be performed for the identified argument paragraphs. Specifically, the corpus of documents in the document database 38b may be searched to find legal references (e.g., cases or statutes) associated with legal issues or legal arguments contained in each of the argument paragraphs. In some examples, a search may be performed for each argument paragraph identified by the argument paragraph identification logic 48. In other examples, a search may be performed only for a subset of the argument paragraphs identified by the argument paragraph identification logic 48 (e.g., the most relevant argument paragraphs as determined by the argument paragraph identification logic 48).

In embodiments, two different types of searches may be performed. The textual search logic 50 may perform a search based on the text of an argument paragraph and the semantic search logic 52 may perform a search based on the semantic content of an argument paragraph. Each type of search may return a set of results including one or more legal references from the document database 38b along with a relevancy score for each such reference. The search combination logic 54 may then combine the two search results and the search result transmission logic 56 may transmit the combined search results to the user computing device 12a. Further details of the textual search logic 50, the semantic search logic 52, the search combination logic 54, and the search result transmission logic 56 are discussed below.

The textual search logic 50 performs a search for legal references relevant to an argument paragraph based on the text of the argument paragraph. Specifically, the textual search logic 50 performs keyword based searching. In particular, the textual search logic 50 compares the text of an argument paragraph against the text in the corpus index 38c.

As discussed above, the corpus index 38c includes an index associated with the document database 38b. That is, for each document in the document database 38b, the corpus index 38c includes certain passages associated with the document. In the illustrated example, as discussed above, the corpus index 38c includes headnotes and reasons for citing associated with each document in the document database 38b. In other examples, the corpus index 38c may contain other text or data associated with the document database 38b. In the illustrated example, the headnotes and reasons for citing contained in the corpus index 38c are determined by experts who have reviewed the documents in the document database 38b. However, in other examples, the corpus index 38c may be automatically generated using machine learning or other techniques. The corpus index 38c is typically much smaller than the document database 38b. As such, the corpus index 38c allows a search to be performed much faster than if a search was performed on the document database 38b itself.

In embodiments, the textual search logic 50 compares the text of an argument paragraph to the text from index items in the corpus index 38c associated with documents in the document database 38b. In some examples, the textual search logic 50 performs the textual search based on a portion of the text of the argument paragraph including only certain words or phrases therein. For example, the textual search logic 50 may perform a search based on words of the search having the highest TF-IDF score (e.g., a predetermined number of words with the highest TF-IDF scores or all words having a TF-IDF score over a predetermined threshold). The textual search logic 50 may generate a textual search score for a document based on how closely the text or a portion of the text of an argument paragraph matches the text in the corpus index 38c associated with the document. In some examples, the textual search logic 50 may utilize Elasticsearch or another search engine to perform the textual search. After performing a search for a particular argument paragraph, the textual search logic 50 may return a ranked list of documents from the document database 38b and a textual search score for each returned document, wherein the documents may be ranked based on the textual search score.

In embodiments, the semantic search logic 52 compares the semantic meaning of an argument paragraph to the semantic meaning of index items from the corpus index 38c associated with documents in the document database 38b. While the textual search logic 50 performs a search by comparing the actual text of an argument paragraph to the text of index items in the corpus index 38c, the semantic search logic 52 performs a search by comparing the semantic meaning of an argument paragraph to the semantic meaning of index items in the corpus index 38c. As such, the textual search logic 50 and the semantic search logic 52 may return different results, which may result in an improved search when considering results from both types of searches.

The semantic search logic 52 may determine a vector representation or embedding of an argument paragraph, which may represent a semantic meaning of the argument paragraph. In some examples, the semantic search logic 52 may use Bidirectional Encoder Representations from Transformers (BERT) to determine a vector representation of an argument paragraph. In other examples, other natural language processing tools may be used to determine a vector representation of an argument paragraph. A vector representation of index items of the corpus index 38c (e.g., headnotes and reasons for citing) may also be determined and may be stored in the data storage component 36.

In embodiments, the semantic search logic 52 may perform a semantic search by comparing the vector representation of an argument paragraph to a vector representation of an index item of the corpus index 38c. In some examples, the corpus index 38c may be quite large and it may not be practical to directly compare the vector representation of each argument paragraph to the vector representation of each index item of the corpus index 38c. Accordingly, in some examples, the semantic search logic 52 may perform an approximate nearest neighbor search to determine the documents from the corpus index 38c with the closest semantic similarity to an argument paragraph, based on the vector representations.

After identifying a plurality of documents from the corpus index 38c that are most similar to an argument paragraph using an approximate nearest neighbor search, the semantic search logic 52 may determine a semantic search score for each identified document by comparing the vector representation of the argument paragraph to the vector representation of each identified document. In some examples, the semantic search logic 52 may determine a semantic search score for a document based on a cosine similarity between the vector representation of the argument paragraph and the vector representation of the document. In some examples, the textual search logic 50 may utilize Elasticsearch or another search engine to perform the textual search. The semantic search logic 52 may then return a ranked list of documents from the document database 38*b* and a semantic search score for each document, wherein the documents may be ranked based on the semantic search score.

After the textual search logic 50 performs a textual search and the semantic search logic 52 performs a semantic search, two result sets are available. One result set is based on the textual search and one result set is based on the semantic search. As discussed above, these two searches may yield different results. Thus, combining the two search results may yield more useful results than either search result individually. The search results may be combined by the search combination logic 54, as disclosed herein.

As discussed above, the textual search logic 50 and the semantic search logic 52 each provide a ranked list of search results. In addition, the textual search logic 50 provides a textual search score for each returned item and the semantic search logic 52 returns a semantic search score for each returned item. A textual search score for a document indicates how closely the text of the document matches the text of an argument paragraph and a semantic search score for a document indicates how closely the semantic meaning of the document matches the semantic meaning of an argument paragraph. However, the textual search scores and the semantic search scores may not be directly comparable. For example, they may be presented on a different scale such that direct comparison may overweight one set of results compared to the other. Accordingly, the search combination logic 54 may normalize the textual search scores and the semantic search scores so that they can be directly compared. For example, the search combination logic 54 may convert each textual search score so that the textual search scores range between 0-1. The search combination logic 54 may similarly convert each semantic search score so that the semantic search scores range between 0-1. The conversion of the textual search scores and the semantic search scores may depend on the range of textual search scores and semantic search scores determined by the textual search logic 50 and the semantic search logic 52, respectively.

After normalizing the textual search scores and the semantic search scores, the search combination logic 54 can rank the documents from both the textual search and the semantic search based on the normalized scores resulting in combined search results. Each argument paragraph for which a search is performed may be associated with search results. Accordingly, a ranked list of search results may be determined for each argument paragraph of a legal brief or for each paragraph of a subset of argument paragraphs for which a search is performed (e.g., the most important argument paragraphs as determined by the argument paragraph identification logic 48).

The search result transmission logic 56 may transmit the combined search results to the user computing device 12*a* for presentation to a user. In some examples, the search result transmission logic 56 may transmit the ranked list of the combined search results associated with each argument paragraph identified by the argument paragraph identification logic 48 to the user computing device 12*a*, which may present the ranked lists to a user. In some examples, if a search was only performed for certain argument paragraphs among the argument paragraphs identified by the argument paragraph identification logic 48 (e.g., the most important argument paragraphs), then the search result transmission logic 56 may transmit the search results associated with each argument paragraph for which a search was performed to the user computing device 12*a*.

In some examples, the search result transmission logic 56 may cause the user computing device 12*a* to present the search results associated with each argument paragraph adjacent to the associated argument paragraph (e.g., in a separate, adjacent column in a word processor). As such, a user may easily ascertain the legal documents from the search results that are associated with various paragraphs of the legal brief. In embodiments, the user computing device 12*a* may display particular information about a legal case from the document database 38*b* identified in the search results adjacent to the argument paragraph for which the search result was identified. In some examples, this information may include the name of a case, the jurisdiction of the case, and passages of text from the case (e.g., headnotes and reasons for citing). In some examples, this information may also include legal concepts associated with the case that relate to an associated argument paragraph. The corpus index 38*c* may store such legal concepts, as determined by expert review, in association with index items associated with documents from the document database 38*b*.

In some examples, the search result transmission logic 56 may also transmit a list of all the legal concepts associated with the transmitted search result. As discussed above, the corpus index 38*c* may store legal concepts associated with index items. Thus, when the textual search logic 50 or the semantic search logic 52 return search results, they may also return legal concepts associated with those search results. The search result transmission logic 56 may then transmit search results along with all of the legal concepts so identified. The user computing device 12*a* may then present these logic concepts to a user. For example, the legal concepts may be displayed near the top of the legal brief document such that the user can easily view the legal concepts determined in the legal brief analysis.

The user input reception logic 58 may receive user input that may cause the server computing device 12*b* to perform additional searches, as disclosed herein. In one example, as discussed above, the user computing device 12*a* may display search result information associated with certain argument paragraphs adjacent to the associated argument paragraphs. However, as discussed above, a search may not be performed for all argument paragraphs and search results may not be displayed for all argument paragraphs. Furthermore, the argument paragraph identification logic 48 may not be completely accurate in identifying argument paragraphs and/or in identifying the most relevant argument paragraphs. Thus, a user may desire search results to be displayed for argument paragraphs in which search results are not initially displayed.

In some examples, a user may click on a paragraph using the user computing device 12*a* to request that search results be displayed for that paragraph. The user computing device 12*a* may then transmit this request to the server computing device 12*b*, which may be received by the user input reception logic 58. When the user input reception logic 58 receives such a request, if the server computing device 12*b* has performed a search for the selected paragraph but the search result transmission logic 56 has not transmitted the search results, then the search result transmission logic 56 may transmit the search results associated with the selected paragraph to the user computing device 12*a*. Alternatively, if the server computing device 12*b* has not performed a search for the selected paragraph (e.g., because the argument paragraph identification logic 48 did not identify the selected paragraph as an important argument paragraph), then the server computing device 12*b* may perform a new search based on the selected paragraph utilizing the techniques described herein. The search result transmission logic 56 may then transmit the new search results associated with the selected paragraph to the user computing device 12*a* and the user computing device 12*a* may display the search results.

In some examples, as discussed above, the user computing device 12*a* may display a list of legal concepts associated with search results obtained by the server computing device 12*b*. In these examples, the user may review the list of legal concepts and determine that certain legal concepts should not have been included in the search (e.g., certain legal concepts are not important to the legal brief). As such, the user may utilize the user computing device 12*a* to select one or more legal concepts that the user would prefer not be included in the search. After the user selects these one or more legal concepts, the selected legal concepts may be transmitted to the server computing device 12*b* and may be received by the user input reception logic 58. The server computing device 12*b* may then perform a new search without considering the selected legal topics, utilizing the techniques described herein. For example, search results for index items of the corpus index 38*c* that relate to the selected legal topics may be ignored. The search result transmission logic 56 may then transmit the new search results to the user computing device 12*a* and the user computing device 12*a* may display the new search results.

As mentioned above, the various components described with respect to FIG. 2 may be used to carry out one or more processes and/or provide functionality for performing legal brief analysis. An illustrative example of the various processes is described with respect to FIG. 3. Although the steps associated with the blocks of FIG. 3 will be described as being separate tasks, in other embodiments, the blocks may be combined or omitted. Further, while the steps associated with the blocks of FIG. 3 will be described as being performed in a particular order, in other embodiments, the steps may be performed in a different order.

Figure 3:
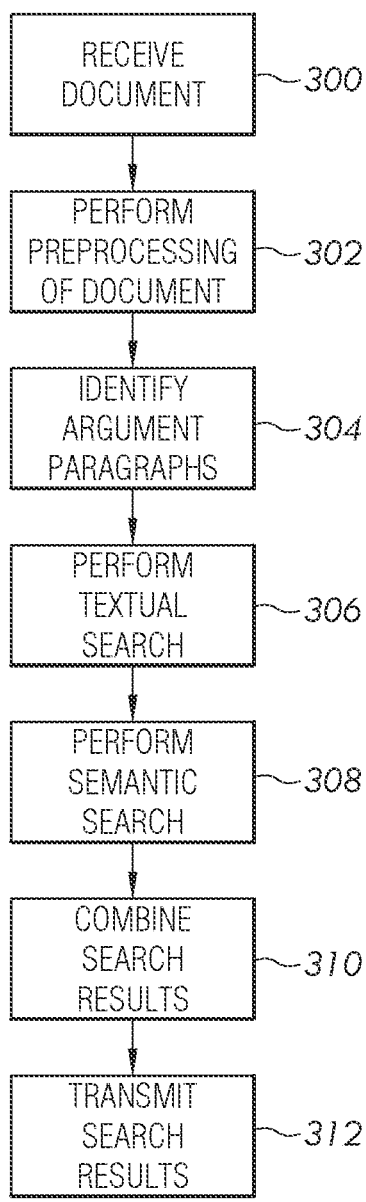
FIG. 3 depicts a flow diagram of an illustrative method of performing legal brief analysis database according to one or more embodiments shown and described herein.

FIG. 3 shows an example method of performing legal brief analysis that may be performed by the server computing device 12*b*. At step 300, the document reception logic 44 receives an electronic document from the user computing device 12*a*. The received document may be a legal brief.

At step 302, the document pre-processing logic 46 performs pre-processing of the document received by the document reception logic 44. The pre-processing may include converting a plurality of paragraphs of the document into a plurality of logical passages as described above. In particular, the document pre-processing logic 46 may utilize one or more predetermined business rules to perform the pre-processing of the document.

At step 304, the argument paragraph identification logic 48 identifies one or more argument paragraphs containing one or more legal arguments from among the plurality of logical passages identified by the document pre-processing logic 46, as described above. In particular, the argument paragraph identification logic 48 determines a feature embedding of each logical passage identified by the document pre-processing logic 46 and inputs the feature embedding of each logical passage into a trained model. The model may be trained to predict whether a paragraph or logical passage is an argument paragraph based on a feature embedding of the paragraph or logical passage. A method of training the model is discussed below in connection with FIG. 5. The argument paragraph identification logic 48 may identify one or more argument paragraphs from among the logical passages determined by the document pre-processing logic 46 based on the output of the trained model.

At step 306, the textual search logic 50 performs a textual search based on one or more argument paragraphs identified by the argument paragraph identification logic 48 as discussed above. In particular, the textual search logic 50 compares the text of one or more of the argument paragraphs identified by the argument paragraph identification logic 48 to the text of index items in the corpus index 38*c* associated with the document database 38*b*. After performing the textual search, the textual search logic 50 returns a ranked list of legal documents associated with the one or more of the argument paragraphs for which the search was performed.

At step 308, the semantic search logic 52 performs a semantic search based on one or more argument paragraphs identified by the argument paragraph identification logic 48 as discussed above. In particular, the semantic search logic 52 determines a vector representation of one or more argument paragraphs identified by the argument paragraph identification logic 48. The semantic search logic 52 then compares these vector representations to vector representations of index items of the corpus index 38*c*. In some examples, the semantic search logic 52 may perform an approximate nearest neighbor search and may then determine a cosine similarity to the index items identified by the approximate nearest neighbor search. After performing the semantic search, the semantic search logic 52 returns a ranked list of legal documents associated with the one or more of the argument paragraphs for which the search was performed.

At step 310, the search combination logic 54 combines the search results determined by the textual search logic 50 and the semantic search logic 52, as discussed above. In particular, the search combination logic 54 normalizes textual search scores determined by the textual search logic 50 and semantic search scores determined by the semantic search logic 52 and determines a ranked list of combined search results based on the normalized scores.

At step 312, the search result transmission logic 56 transmits the combined search results to the user computing device 12*a*. The user computing device 12*a* may then present the combined search results to a user, as discussed above.

Figure 4:
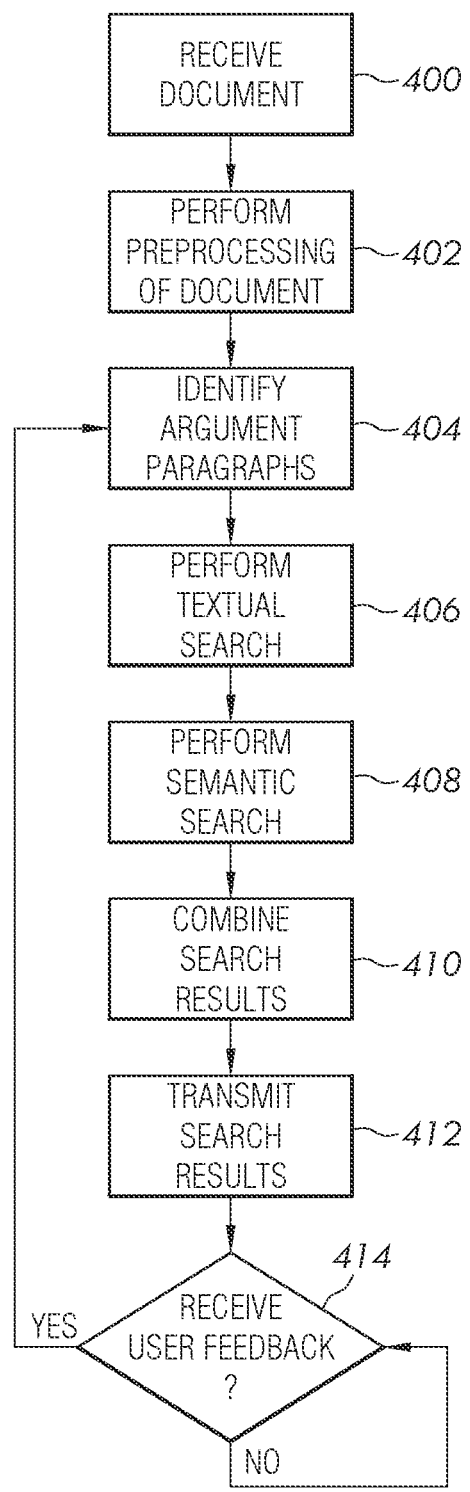
FIG. 4 depicts a flow diagram of another illustrative method of performing legal brief analysis according to one or more embodiments shown and described herein.

Referring now to FIG. 4, a flow diagram of another illustrative method that may be performed by the server computing device 12*b* to perform legal brief analysis is depicted. In the example of FIG. 4, steps 400-412 are the same as steps 300-312 of FIG. 3. As such, discussion of these steps will be omitted.

At step 414, the user input reception logic 58 determines whether user feedback has been received from the user computing device 12*a* after the combined search results are presented to the user. In one example, a user may be presented with a list of legal concepts that the server computing device 12*b* has identified in the legal brief being analyzed. The user may then select one or more of the identified legal concepts that should not be included in the search.

If the user input reception logic 58 determines that no user feedback has been received (no at step 414), then control stays at step 414. Alternatively, if the user input reception logic 58 determines that user feedback has been received (yes at step 414), then control returns to step 404. At step 404, the argument paragraph identification logic 48 determines a new set of argument paragraphs from the document based on the received user feedback. For example, if the user feedback includes certain legal concepts selected by the user that should not be included in the search, then the argument paragraph identification logic 48 determines argument paragraphs from the document without including any paragraphs related to the selected legal concepts. Control then flows to steps 406-410 wherein textual and semantic searches are performed and the search results combined based on the newly identified argument paragraphs. Then at step 412, new search results are transmitted to the user computing device 12*a*, and the new search results may be presented to the user.

Figure 5:
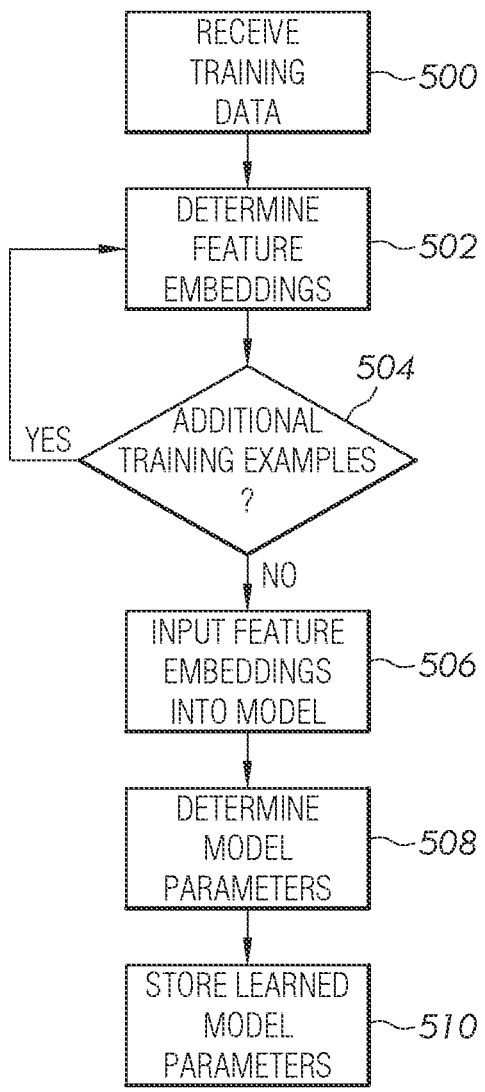
FIG. 5 depicts a flow diagram of an illustrative method of training a machine learning model to identify argument paragraphs from a legal brief according to one or more embodiments shown and described herein.

Referring now to FIG. 5, a flow diagram of an illustrative method of training a model to identify argument paragraphs in a legal brief is depicted. At step 500, the model training logic 59 receives training data. As discussed above, the training data may include a plurality of labeled paragraphs from legal briefs. Each labeled paragraph may be considered one training example. In one examples, each paragraph of the training data may be labeled as either an argument paragraph or not an argument paragraph. In another example, each paragraph of the training data may be labeled as either an argument paragraph, not an argument paragraph, or neutral. A neutral paragraph may be considered an argument paragraph or not an argument paragraph without affecting the training loss during training of the model.

At step 502, the argument paragraph identification logic 48 determines feature embeddings for one of the paragraphs of the training data. At step 504, the model training logic 59 determines whether there are additional training example paragraphs that have not had feature embeddings determined. If there are additional training examples (yes at step 504), then control returns to step 502 and the argument paragraph identification logic 48 determines feature embeddings for another paragraph of the training data. If there are no additional training examples (i.e., feature embeddings have been determined for every paragraph of the training data), then control passes to step 506. In some examples, the training data may include feature embeddings of the paragraphs pre-computed. In these examples, steps 502 and 504 of FIG. 5 may be omitted.

At step 506, the model training logic 59 inputs the feature embeddings into a machine learning model. In the illustrated example, the model training logic 59 inputs the feature embeddings into a random forest model. However, in other examples, other types of machine learning models may be used.

At step 508, the model training logic 59 trains the model, as discussed above. In particular, the model training logic 59 uses supervised learning techniques to learn model parameters that minimize a cost function associated with the labeled training data. At step 510, the model training logic 59 stores the learned model parameters in the data storage component 36.

It should now be understood that embodiments described herein are directed to a method and system for performing legal brief analysis. A legal brief to be analyzed may be uploaded by a user from a user computing device to a server computing device in the form of an electronic document. The server computing device may receive the legal brief and may perform pre-processing of the legal brief to convert the paragraphs of the brief into logical passages. The server computing device may then determine which logical passages of the legal brief include argument paragraphs that include legal arguments by inputting feature embeddings of the logical passages into a trained machine learning model.

The server computing device may perform a textual search of an index associated with a corpus of legal documents based on the text of the argument paragraphs. The server computing device may also determine a vector representation of the argument paragraphs and perform a semantic search of the index based on the vector representations of the argument paragraphs. The results of the textual search and the semantic search may then be combined by normalizing search scores associated with the textual search and the semantic search.

The server computing device may then transmit the combined search results to the user computing device and the user computing device may display the combined search results to the user. After the search results are displayed to the user, the user may provide feedback, such as deselecting certain identified legal concepts as described above, to cause a new search to be performed by the server computing device based on the user feedback.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving, at a computing device, training data comprising a plurality of paragraphs from a plurality of legal briefs, wherein each paragraph of the training data is labeled as to whether the paragraph is an argument paragraph containing one or more legal arguments;
   using the training data to train a machine learning model to determine whether an input paragraph is an argument paragraph by using supervised learning techniques;
   receiving, at the computing device, an electronic document, wherein the electronic document is a legal brief comprising a plurality of paragraphs;
   inputting the plurality of paragraphs of the electronic document into the trained machine learning model to identify one or more argument paragraphs from among the plurality of paragraphs, wherein each of the one or more argument paragraphs includes one or more legal arguments;
   performing a textual search of a corpus of legal documents by comparing text of the identified argument paragraphs to text of the legal documents in the corpus;
   performing a semantic search of the corpus of legal documents by comparing semantic meanings of the identified argument paragraphs to semantic meanings of the legal documents in the corpus, wherein performing the semantic search comprises:
      determining a vector representation of one or more words of an argument paragraph;
      comparing the vector representation of the one or more words of the argument paragraph to a vector representation of an index of the corpus by:
         identifying a plurality of documents of the corpus using an approximate nearest neighbor search; and
         determining a cosine similarity between the vector representation of the one or more words of the argument paragraph and a vector representation of the documents identified using the approximate nearest neighbor search; and returning a score for one or more documents in the corpus based on the comparison;

combining results of the textual search and the score returned from the semantic search; and presenting the combined results to a user by displaying the combined results associated with each identified argument paragraph adjacent to the associated identified argument paragraph in a word processing program.

2. The method of claim 1, further comprising:

converting the plurality of paragraphs into a plurality of logical passages; and identifying the one or more argument paragraphs from among the plurality of logical passages.

3. The method of claim 1, wherein identifying the one or more argument paragraphs from among the plurality of paragraphs comprises:

determining a feature embedding of each paragraph of the plurality of paragraphs; and inputting the feature embedding of each paragraph into a trained machine learning model.

4. The method of claim 3, wherein the machine learning model is trained to predict whether a paragraph is an argument paragraph based on a feature embedding of the paragraph using supervised learning techniques.

5. The method of claim 4, wherein the machine learning model is trained using training data comprising a plurality of paragraphs from legal briefs, wherein a subset of the plurality of paragraphs are labeled as argument paragraphs.

6. The method of claim 3, wherein the feature embedding of each paragraph is based on a term frequency-inverse document frequency score of a plurality of words contained in the paragraph.

7. The method of claim 3, wherein identifying the one or more argument paragraphs from among the plurality of paragraphs further comprises inputting metadata associated with the plurality of paragraphs into the machine learning model.

8. The method of claim 1, wherein performing the textual search comprises:

comparing the text of an argument paragraph to the text of an index of the corpus; and returning a score for one or more documents in the corpus based on the comparison.

9. The method of claim 1, wherein combining the results of the textual search and the semantic search comprises:

receiving a textual search score associated with each of a first plurality of documents of the corpus based on the textual search, wherein the textual search score indicates a textual similarity between an argument paragraph and a document in the corpus;

receiving a semantic search score associated with each of a second plurality of documents of the corpus based on the semantic search, wherein the semantic search score indicates a semantic similarity between an argument paragraph and a document in the corpus;

normalizing the textual search score and the semantic search score; and ranking documents from the first plurality of documents and the second plurality of documents based on the normalized textual search scores and the normalized semantic search scores.

10. The method of claim 1, wherein presenting the combined results to the user comprises:

displaying information associated with one or more documents of the corpus based on the combined search results; and wherein the information associated with each of the one or more documents of the corpus is positioned adjacent to a paragraph among the identified argument paragraphs that caused the document to be returned as a search result.

11. The method of claim 1, further comprising:

displaying a plurality of legal concepts associated with combined search results;

receiving, from the user, a selected set of the plurality of legal concepts to not be included in the search results;

performing a second textual search of the corpus and a second semantic search of the corpus based on the plurality of legal concepts without including the selected set of the plurality of legal concepts;

combining the results of the second textual search and the second semantic search; and presenting the combined results of the second textual search and the second semantic search to the user.

12. A system, comprising:

a processing device; and a non-transitory, processor-readable storage medium comprising one or more programming instructions stored thereon that, when executed, cause the processing device to:

receive training data comprising a plurality of paragraphs from a plurality of legal briefs, wherein each paragraph of the training data is labeled as to whether the paragraph is an argument paragraph containing one or more legal arguments;

use the training data to train a machine learning model to determine whether an input paragraph is an argument paragraph by using supervised learning techniques;

receive an electronic document, wherein the electronic document is a legal brief comprising a plurality of paragraphs;

input the plurality of paragraphs of the electronic document into the training learning model to identify one or more argument paragraphs from among the plurality of paragraphs, wherein each of the one or more argument paragraphs includes one or more legal arguments;

perform a textual search of a corpus of legal documents by comparing text of the identified argument paragraphs to text of the legal documents in the corpus;

perform a semantic search of the corpus of legal documents by comparing semantic meanings of the identified argument paragraphs to semantic meanings of the legal documents in the corpus; wherein the programming instructions cause the processing device to perform the semantic search by:

determining a vector representation of one or more words of an argument paragraph;

comparing the vector representation of the one or more words of the argument paragraph to a vector representation of an index of the corpus by:

identifying a plurality of documents of the corpus using an approximate nearest neighbor search; and determining a cosine similarity between the vector representation of the one or more words of the argument paragraph and a vector representation of the documents identified using the approximate nearest neighbor search; and returning a score for one or more documents in the corpus based on the comparison;

combine results of the textual search and results of the semantic search; and present the combined results to a user by displaying the combined results associated with each identified argument paragraph adjacent to the associated identified argument paragraph in a word processing program.

13. The system of claim 12, wherein the programming instructions further cause the processing device to:

determine a feature embedding of each paragraph of the plurality of paragraphs;

input the feature embedding of each paragraph into a trained machine learning model; and identify the one or more argument paragraphs based at least in part on an output of the trained machine learning model.

14. The system of claim 13, wherein the programming instructions further cause the processing device to input metadata associated with the plurality of paragraphs into the machine learning model.

15. The system of claim 12, wherein the programming instructions further cause the processing device to perform the textual search by:

comparing the text of an argument paragraph to the text of an index of the corpus; and returning a score for one or more documents in the corpus based on the comparison.

16. The system of claim 12, wherein the programming instructions further cause the processing device to combine the results of the textual search and the semantic search by:

receiving a textual search score associated with each of a first plurality of documents of the corpus based on the textual search, wherein the textual search score indicates a textual similarity between an argument paragraph and a document in the corpus;

receiving a semantic search score associated with each of a second plurality of documents of the corpus based on the semantic search, wherein the semantic search score indicates a semantic similarity between an argument paragraph and a document in the corpus;

normalizing the textual search score and the semantic search score; and ranking documents from the first plurality of documents and the second plurality of documents based on the normalized textual search scores and the normalized semantic search scores.

17. A non-transitory, computer-readable storage medium that is operable by a computer, the non-transitory, computer-readable medium comprising one or more programming instructions stored thereon for causing a processing device to:

receive training data comprising a plurality of paragraphs from a plurality of legal briefs, wherein each paragraph of the training data is labeled as to whether the paragraph is an argument paragraph containing one or more legal arguments;

use the training data to train a machine learning model to determine whether an input paragraph is an argument paragraph by using supervised learning techniques;

receive an electronic document, wherein the electronic document is a legal brief comprising a plurality of paragraphs;

input the plurality of paragraphs of the electronic document into the trained machine learning model to identify one or more argument paragraphs from among the plurality of paragraphs, wherein each of the one or more argument paragraphs includes one or more legal arguments;

perform a textual search of a corpus of legal documents by comparing text of the identified argument paragraphs to text of the legal documents in the corpus;

perform a semantic search of the corpus of legal documents by comparing semantic meanings of the identified argument paragraphs to semantic meanings of the legal documents in the corpus, wherein the programming instructions cause the processing device to perform the semantic search by:

determining a vector representation of one or more words of an argument paragraph;

comparing the vector representation of the one or more words of the argument paragraph to a vector representation of an index of the corpus by:

identifying a plurality of documents of the corpus using an approximate nearest neighbor search; and determining a cosine similarity between the vector representation of the one or more words of the argument paragraph and a vector representation of the documents identified using the approximate nearest neighbor search; and returning a score for one or more documents in the corpus based on the comparison;

combine results of the textual search and results of the semantic search; and present the combined results to a user by displaying the combined results associated with each identified argument paragraph adjacent to the associated identified argument paragraph in a word processing program.

* * * * *